United States Patent
Schieferdecker et al.

(10) Patent No.: US 10,739,201 B2
(45) Date of Patent: Aug. 11, 2020

(54) HIGH-RESOLUTION THERMOPILE INFRARED SENSOR ARRAY

(71) Applicant: Heimann Sensor GmbH, Dresden (DE)

(72) Inventors: Jörg Schieferdecker, Dresden (DE); Bodo Forg, Mainz (DE); Michael Schnorr, Hünstetten-Wallbach (DE); Karlheinz Storck, Lorch am Rhein (DE); Wilhelm Leneke, Taunusstein (DE); Marion Simon, Bad Schwalbach (DE)

(73) Assignee: Heimann Sensor GmbH, Dresden (DE)

( * ) Notice: Subject to any disclaimer, the term of this patent is extended or adjusted under 35 U.S.C. 154(b) by 0 days.

(21) Appl. No.: 16/477,273

(22) PCT Filed: Jan. 18, 2018

(86) PCT No.: PCT/EP2018/051166
§ 371 (c)(1),
(2) Date: Jul. 11, 2019

(87) PCT Pub. No.: WO2018/134288
PCT Pub. Date: Jul. 26, 2018

(65) Prior Publication Data
US 2020/0033195 A1    Jan. 30, 2020

(30) Foreign Application Priority Data

Jan. 18, 2017 (DE) .......... 10 2017 100 910
Feb. 13, 2017 (DE) .......... 10 2017 102 833

(51) Int. Cl.
*G01J 5/00* (2006.01)
*G01J 5/08* (2006.01)
(Continued)

(52) U.S. Cl.
CPC .......... *G01J 5/0884* (2013.01); *G01J 5/0831* (2013.01); *G01J 5/12* (2013.01); *H04N 5/33* (2013.01); *H04N 5/378* (2013.01)

(58) Field of Classification Search
CPC .......... G01J 5/0884; G01J 5/12; H04N 5/378; H04N 5/0881
See application file for complete search history.

(56) References Cited

U.S. PATENT DOCUMENTS 8,018,579 B1 * 9/2011 Krah .................. G01S 7/4861
                                                356/4.01
8,179,296 B2   5/2012 Kelly et al.
(Continued)

FOREIGN PATENT DOCUMENTS

DE       10322860      11/2005
DE      102010042108   10/2013
(Continued)

OTHER PUBLICATIONS

Longmire et al., "Simulation of clutter rejection signal processing for mid-infrared surveillance systems", 1981, SPIE proceedings of Precocessing of Images and Date from Optical Sensors, vol. 292, pp. 193-203 (Year: 1981).*

(Continued)

*Primary Examiner* — Kiho Kim
(74) *Attorney, Agent, or Firm* — Smartpat PLC (57) ABSTRACT

High-resolution thermopile infrared sensor array having a plurality of parallel signal processing channels for the signals of a sensor array and a digital port for serially emitting the signals. Each signal processing channel comprises at least one analog to digital converter and is assigned a memory for storing the results of the analog to digital converters. Power consumption of the infrared sensor array is reduced in the case of a sensor array with at least 16 rows and at least 16 columns, in that no more than 8 or 16 pixels (Continued)

are connected to a signal processing channel. The number of signal processing channels corresponds to at least 4 times the number of rows. Some of the signal processing channels are disposed in the intermediate space between the pixels and others are disposed in an outer edge region of the sensor chip surrounding the sensor array along with other electronics.

7 Claims, 5 Drawing Sheets (51) Int. Cl.
*G01J 5/12* (2006.01)
*H04N 5/33* (2006.01)
*H04N 5/378* (2011.01)

(56) References Cited

U.S. PATENT DOCUMENTS

| 9,270,895 B2 | 2/2016 | Kelly et al. |
| 2006/0243885 A1 | 11/2006 | Watanabe |
| 2007/0187602 A1 | 8/2007 | Wennmacher et al. |
| 2007/0194962 A1* | 8/2007 | Asayama ............ H03M 1/66 341/144 |
| 2008/0216883 A1 | 9/2008 | Leneke et al. |
| 2011/0174978 A1 | 7/2011 | Forg et al. |
| 2013/0093037 A1 | 4/2013 | Kirihara et al. |
| 2018/0283958 A1 | 10/2018 | Forg et al. |

FOREIGN PATENT DOCUMENTS

| EP | 2587234 A1 | 5/2013 |
| JP | 2004170375 A | 6/2004 |
| WO | 2006122529 A2 | 11/2006 |
| WO | 2017059970 A1 | 4/2017 |

OTHER PUBLICATIONS

Kassovski V, Grigorov A, Hristov H, Nedelev P, Forg B, Herrmann F, Leneke W, Schieferdecker J; Miniaturized 4x16 Thermopile Array Sensor with Integrated on Signal Conditioning on Chip, Proceedings IRS 2011, Jan. 1, 2011, Nürnberg, p. 57.

Kassovski, Viktor: Minituarized 4x16 thermopile array sensor with integrated on chip signal conditioning. In: SENSOR + TEST Conferences 2011—SENSOR, OPTO, IRS2. Wunstorf : AMA Service GmbH, 2011 p. 238, ISBN 978-3-9810993-8-6.

Kimata Masafumi, Trends in small-format infrared array sensors, 2013 IEEE Sensors, Nov. 3, 2013, IEEE, pp. 1-4.

Schnorr M, Forg B, Herrmann F, Leneke W, Simon M, Schieferdecker J, New miniaturized Thermopile IR Arrays with medium resolution, Proceedings IRS$_2$ 2015, Jan. 1, 2015; May 19, 2015-May 21, 2015, AMA Conferences 2015 May 19, 2015-May 21, 2015 Nürnberg, Germany, pp. 957-960.

\* cited by examiner

HIGH-RESOLUTION THERMOPILE INFRARED SENSOR ARRAY

TECHNICAL FIELD

The disclosure relates to a high-resolution thermopile infrared sensor array having at least 16 rows and at least 16 columns and monolithic integrated signal processing on a sensor chip, having a plurality of parallel signal processing channels for the signals of a sensor array, and having a digital port for the serial output of the pixel signals, each signal processing channel having at least one analog/digital converter and one low pass filter, and a storage area in a memory being assigned to each signal processing channel for storing the results of the analog/digital converters.

BACKGROUND

In order to build a high-resolution infrared thermopile sensor array, the number of individual thermopile elements, i.e., the number of pixels, must increase and the geometric dimensions of the pixels themselves must decrease. The thermopile sensor arrays originally available on the market had only a few pixels on (e.g. 8×8 pixels or 16×16 pixels), wherein the individual pixels were rather large (e.g. 150 . . . 300 μm×150 . . . 300 μm). There was therefore sufficient space on the sensor chip (e.g. made of silicon) to accommodate a small number of amplifiers or low-pass filters on the chip next to the thermopile sensor array.

Currently used thermopile sensor arrays with larger pixel counts require a reduction in the dimensions of the pixels to a side length of 100 μm, or even down as far as 25 μm. However, the pixels that are becoming ever smaller due to the increasing integration density have the disadvantage that they generate a smaller signal proportional to their surface area. This means that if a pixel is halved in size, only a quarter of the signal strength is available for further processing.

The resulting ever smaller signal voltages, which are usually in the nV-range up to a few μV, always require greater gain factors, so that signals can be further processed without additional noise or other interference outside of the actual sensor housing. However, the consequence is an ever-smaller signal-to-noise ratio.

The necessary signal amplification due to the low signal voltages is at least on the order of several 1000, usually even over 10,000, in order to raise the signal voltage far enough that it can be passed to other modules and further processed. The analog amplifiers with high gain classically used for signal amplification require multi-stage amplifiers with relatively large space requirements and in addition, these amplifiers have a significant power consumption. This means that the power losses and thus the self-heating increase, which in turn leads to an overall increase in the measurement error of the thermopile sensor array.

In the meantime, infrared thermopile sensor arrays, which are manufactured on a chip using silicon micro-mechanics, have come to be known in different designs. In these sensor arrays, part of the signal processing takes place on the chip, but there are only a few preamplifiers and a common multiplexer present, which outputs the signals from all the pixels. The thermopiles have so-called "hot" contacts on an increasingly smaller infrared reception surface and so-called "cold" contacts on a heat sink at the edge of the respective pixel. The signal voltage generated by the thermopile is directly dependent on the temperature difference that can be achieved between the "hot" and "cold" contacts.

For example, in a thermopile sensor array according to WO 2006/122529 A1 one preamplifier and one low-pass filter are integrated on the chip per row of the sensor array. For high-resolution sensor arrays with multiple rows and columns, however, this is not sufficient. For example, in the case of an array of 64×64 pixels only 64 preamplifiers and 64 low-pass filters are used. The achievable noise bandwidth would be up to 64 times higher than necessary. However, since the noise increases with the square root of the noise bandwidth, the noise could be reduced by up to 8-fold, or the thermal resolution could be improved by up to 8-fold.

However, no measures are specified for a power-saving and space-saving solution for signal amplification per signal channel.

Still, in JP 2004-170375 a thermopile sensor array is disclosed, which has only a single preamplifier.

In DE 103 22 860 B4 a circuit arrangement is described for reading out electronic signals from high-resolution thermal sensors with preamplifers, which are arranged in front of a multiplexer. To reduce the significant power loss of the individual parallel operating preamplifiers, these are cyclically switched off to conserve power.

By precisely this measure, however, the desired high temperature resolution is not achieved, because the preamplifiers before the multiplexer can only deliver the expected result if, at the same time, the noise bandwidth of the sampled signal is reduced in proportion to the number of parallel amplifier channels. This is not possible, however, if the signal amplified via the preamplifiers is not continuously "integrated" by means of a low-pass filter for limiting the noise bandwidth, or smoothed, for example, using a low-pass element.

Document EP 2 587 234 A1 discloses a thermopile infrared sensor with a signal processing circuit, in which the signals of the individual pixels are forwarded without band limitation, or intermediate preamplifiers.

In all the above solutions, thermopile infrared sensor arrays are described, without, however, measures being proposed for signal processing at a higher integration density on the chip. In particular, there are no proposals for reducing the noise bandwidth while, at the same time, retaining minimum space requirements and minimum power loss.

The known solutions have an inadequate thermal resolution, because only a single one or very few preamplifer channels have been integrated on the sensor chip, resulting in a high signal-to-noise bandwidth and at the same time, a poor signal/noise ratio.

A high integration density requires the pixel size and the so-called pixel pitch, i.e. the center-to-center distance between the thermopile pixels, to be reduced in order to accommodate more pixels on the same chip surface area. In addition, as well as a high geometric resolution a high thermal resolution is also desirable, i.e. a large signal/noise ratio and a low noise-limited temperature resolution NETD (Noise Equivalent Temperature Difference).

Because of the smaller reception surface area and because of the resulting small distance between the "hot" and "cold" contacts of the thermopile pixels, a reduction in the pixel size also gives rise to a reduction of the sensor signal emitted from each thermopile pixel, resulting in a lower signal/noise ratio, poorer thermal resolution and a reduced measurement accuracy.

In principle, it is possible to reduce the size of thermopile cells (thermopile pixels) and integrate ever larger numbers of pixels on the sensor chip. For example, 16×16, 32×32, 64×64, 128×128 thermopile pixels or more are implemented on a sensor chip. The signal voltages of the individual thermopile pixels would need to be multiplexed using m×n-addressing and MUX switches, i.e. to be routed onto a common serial signal line to one amplifier per array, or via a common serial interface per row or column.

Since the minimum signals still to be resolved from thermopile pixels with further reduced pixel dimensions for many applications will now be in the nV range, the signals must be amplified to a sufficiently high level and further processed on the chip itself, so that they cannot be affected by electrical interference sources both outside of and within the sensor chip.

Typical amplification factors of 10,000 or more are required in the known solutions, in order to amplify the sensor signals of such small thermopile pixels up to several mV, so that the sensor signals after the MUX (multiplexer) can be output from the sensor chip on a fast serial analog output—or converted into digital signals by a fast AD-converter integrated on or directly adjacent to the sensor chip.

The disadvantage of this is that the bandwidth of these preamplifiers located after the multiplexer must be very high in order to still transmit the sensor signals of many consecutively sampled thermopile pixels with frame rates from several Hz up to several 10 Hz.

To achieve this requires at least m×n times the frame rate in the case of one preamplifier per array, or m times the frame rate for an array with m columns and one amplifier per column. However, the noise of the system also increases and the temperature resolution NETD deteriorates at the same time proportional to the square root of the (noise) bandwidth.

Stable and high-precision amplifiers with high gain require a plurality of amplifier stages, need a relatively large amount of space on the sensor chip and also have a significant power consumption with correspondingly high waste heat, which in turn further reduces the achievable signal voltage of the thermopile elements.

For this reason, on the severely limited space of a sensor chip it is not possible to accommodate many such large amplifiers in addition to the pixels.

Finally, Kassovski ET AL: "Miniaturized 4×16 Thermopile Sensor with Integrated on Signal Conditioning on Chip", Proceedings of IRS 2011, page 57, XP055300518, describes a row array with 4 rows each of 16 elements, hence a total of 64 pixels per line. In this thermopile sensor, 64 signal processing channels are provided for 64 pixels, thus one signal processing channel per pixel, wherein each pixel contains 80 contact temperature sensors.

Each signal processing channel comprises a low-noise amplifier with unknown gain, a 16-bit 2nd order Delta Sigma A/D converter and a digital low-pass filter, wherein the signal processing is carried out on the same chip. The buffering of the measurements is carried out in a RAM on the same chip.

Since this small 64-element array has only 4 rows and a row spacing of 220 µm, two signal processing channels can be readily accommodated on both sides of each of the pixels. Even in a two-dimensional array with 16 rows, 8 signal processing channels would then have to be accommodated on each side, with 64 rows therefore, 32 instead of two channels would be needed per side. For two-dimensional arrays with very many elements this would require a chip with a very large surface area, with associated high costs. Also, no information is given as to how, for arrays with a much greater pixel count and very small pixel pitch of <200 µm or preferably <100 nm, the signals from so many pixels could be processed in parallel and routed to the signal output.

At an operating voltage of 3V the array also consumes a current of 4 mA, which means that a power loss of 12 mW is generated, which in the case of small thermopile infrared sensor arrays would still be acceptable. In the case of larger sensor arrays with larger pixel counts, however, this would look very different, because when reading out such an array with the same current consumption of 4 mA, the resulting electrical power loss would then be much too large.

The equivalent pixel-proportional power consumption produced by a 64×64 sensor array with 64 times more signal processing channels would be almost 250 mA, i.e. a power loss of 0.75 W, and for a 128×128 sensor array a power consumption of almost 1 A at a power loss of 3 W.

Such high power losses, however, exhibit the following disadvantages in thermopile infrared sensor arrays:

if such a high power loss were to be integrated monolithically on the same sensor chip, this would lead to the intrinsic heating of the sensor chip and, in particular after being powered on, to a kind of thermal shock of the sensitive thermopile elements. This results in a lower measurement accuracy of the thermopile elements and a short battery life in portable devices.

In WO 2017/059 970 A1 a high-resolution thermopile infrared sensor array with monolithic integrated signal processing is disclosed, in which the signals of each signal processing channel generated by the sensor array via pre-amplifers and a downstream analog-to-digital converter are buffered in a memory. The selection of the respective signal processing channel is performed by means of a signal multiplexer.

Document U.S. Pat. No. 9,270,895 B2 discloses a method and a device for highly dynamic image generation, in particular for generating a digital representation of a scene with a two-dimensional matrix of IR sensors. For this purpose, each pixel is assigned an analog-to-digital converter and an m-bit counter.

Document US 2006/0 243 885 A1 relates to an image sensor and a method for controlling the same, wherein the object is to create an improved image sensor with small dimensions, in which the light collection array and the A/D converters are arranged on one chip. It is designed to implement a high-speed controller. This is achieved by dividing the image sensor array into a plurality of sub-arrays, which are each assigned to an A/D converter with an associated sub-array controller.

Document U.S. Pat. No. 8,179,296 B2 relates to a method and a device for the digital readout of a sensor array, which is connected to the input of an A/D converter array. The analog/digital array can be used for IR-image sensor applications with high areal resolution (small pixels) and high signal-to-noise ratio.

In JP 2004-170 375 A, a thermopile array sensor is described, in which the white noise, caused by ambient temperature changes and the 1/f noise of the DC amplifier, is to be eliminated. This is achieved by means of a shielded compensation thermopile per row of the array. For signal processing an op-amp is used, which processes the difference between the measurement and compensation signal.

Document WO 2006/122 529 A2 relates to a thermopile infrared sensor array, in which the membrane under each thermopile sensor element is exposed by etching and in which preamplifiers with low-pass filters are provided for at least every fourth, preferably for every column or row of sensor elements.

Document EP 2 587 234 A1 relates to an IR sensor for suppressing changes in the to signal-to-noise ratio as a result of the warming of the chip, by heating the cold contact. On the other hand, thermal radiation or thermal conduction through the gas medium also leads to a heating of the hot contact. Each IR detector in the array is associated with a MOS transistor as a pixel selection switch, and with a plurality of vertical reading lines and horizontal signal lines. Through a combination of series and parallel connection of thermopiles the signal-to-noise ratio can be improved, wherein the output signal from each thermopixel is utilized.

Finally, DE 103 22 860 B4 relates to a circuit arrangement for reading out electronic signals from high-resolution thermal sensors, in which the signals from a plurality of sensor elements are each serially read out via one or a small number of data lines using a multiplexer, and an amplifier is connected between each individual thermal sensor element and the multiplexer. To reduce the thermal load the amplifiers can be switched on and off cyclically.

SUMMARY

The object of the invention is to create a high-resolution thermopile infrared sensor array with a particularly high pixel count, which at high signal resolution exhibits the minimum possible power consumption and thus the minimum possible power loss.

This object is achieved by the fact that in a high-resolution thermopile infrared sensor array of the kind mentioned above, a maximum of 8 or 16 pixels are connected to a signal processing channel, wherein the number of the signal processing channels is equal to at least 4 times the number of rows, that one portion of the signal processing channels is arranged in the intermediate space between the pixels and another portion of the signal processing channels is arranged in the outer edge area of the sensor chip surrounding the sensor array together with other electronics, that each low pass filter has a cutoff frequency of no more than eight times the value of the product of the frame rate of the thermopile infrared sensor array and the number of pixels per signal processing channel, and wherein the center-to-center distance between the pixels is less than 200 µm.

In addition, for each signal processing channel a signal multiplexer is provided for selecting the pixel of the sensor array which is assigned to the signal-processing channel.

A preamplifier is connected upstream of the analog-to-digital converter in each signal processing channel, having a gain factor of between less than 500 and less than 100.

The analog-to-digital converter operates according to the charge balancing or Delta-Sigma method.

In a further development, each signal processing channel contains a low-pass filter to limit the noise bandwidth, whose cutoff frequency is equal to at least the product of the frame rate of the thermopile infrared sensor array and the number of pixels per signal processing channel, preferably less than three times the value of the product.

The analog-to-digital converter is preferably designed to be integrating and the low-pass filter is arranged in the analog-to-digital converter.

The noise bandwidth of each signal processing channel is determined as a function of the respective frame rate by using an integrating analog-to-digital converter by the externally specified or internally generated mother clock and the specified conversion rate of the analog-to-digital converter.

A portion of the signal processing channels is arranged with the sensor elements on a separate chip underneath the sensor chip, wherein the thermopile infrared sensor chip and the separate chip are fixedly connected to each other.

The invention is described below in further detail based on exemplary embodiments.

BRIEF DESCRIPTION OF THE DRAWINGS

FIG. 4 is a block wiring diagram of a circuit arrangement for integrated signal processing for thermopile infrared array chips in a third embodiment, wherein a plurality of pixels share a signal processing channel, with FIG. 4a low-pass filter after the preamplifer and FIG. 4b an integrating AD-converter, which performs the low-pass function.

DETAILED DESCRIPTION

Figure 1:
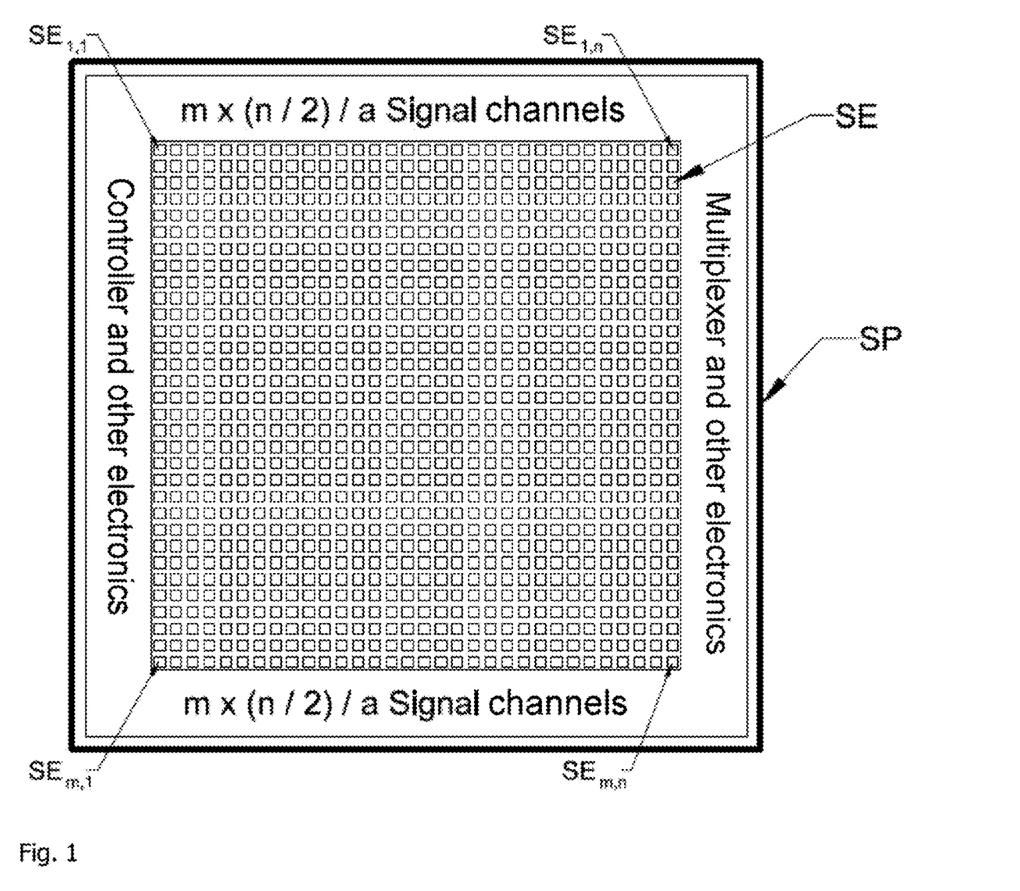
FIG. 1 shows the essential structure of a thermopile infrared sensor array.
Figure 2:
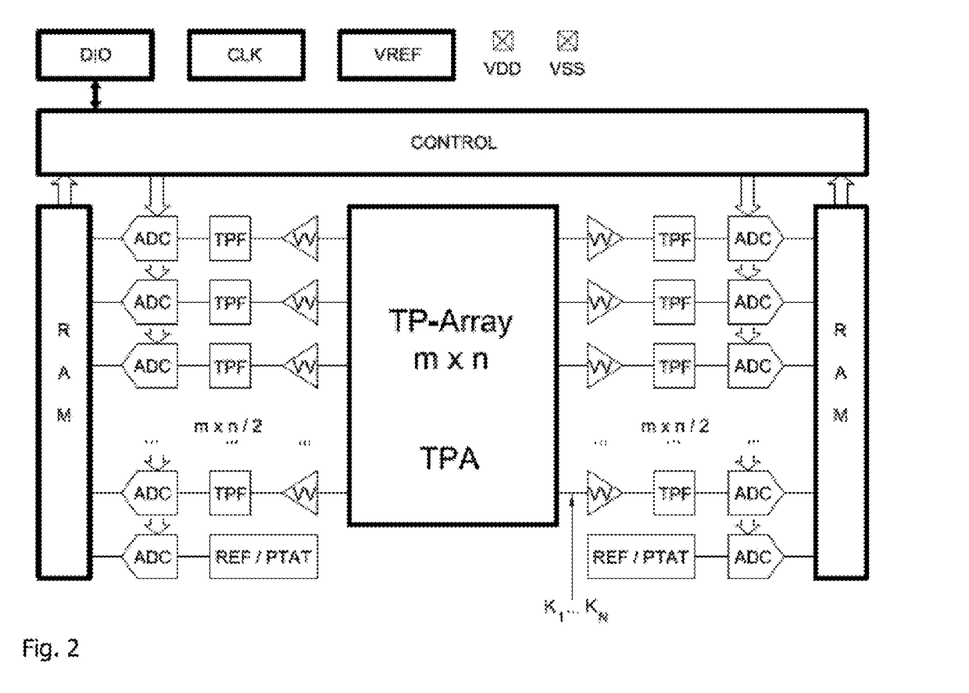
FIG. 2 is a block wiring diagram of a circuit arrangement for the integrated signal processing for thermopile infrared array sensor chips with a low-pass filter and one signal processing channel per pixel.

From FIG. 1, 2 the essential structure of a thermopile infrared sensor array can be seen, with a thermopile infrared sensor array TPA in matrix form arranged in the center of the sensor chip, with m×n pixels SE 1.1 . . . SE 1.n× SE m1.1 . . . SE m, n. Around the pixels SE, or around the pixel field, m×(n/2)/a signal processing channels $K_1 \ldots K_N$ are preferably located on both sides of the same sensor chip SP, which amplify and filter the signals of the individual pixels SE, and convert them into digital signals. A number of pixels a here share a signal processing channel $K_1 \ldots K_N$.

In principle, all signal processing channels $K_1 \ldots K_N$ can be located on one side of the pixel field, wherein the thermopile infrared sensor array then has an asymmetric heat distribution.

Essential for the function of thermopiles is the fact that they have "hot" and "cold" contacts which are connected to each other via conductive tracks that are as long as possible, i.e. arranged as far away from each other as possible, and wherein the "hot" contacts are arranged on a radiation receiver (not shown) and the "cold" contacts are arranged on a heat sink at the edge of the pixel SE, to generate a signal voltage that can be evaluated as a function of the temperature difference between the "hot" and "cold" contacts.

Each pixel SE of the thermopile infrared sensor array TPA contains a known miniaturized thermopile cell and above each thermopile cell, an optional radiation entry window with a suitable set of optics. Each of the thermopile cells have a center-to-center spacing (the so-called pixel pitch) of less than 200 μm. The smaller the pixel pitch, the smaller is the entire thermopile infrared sensor array chip, and the size of the required lens for imaging the infrared radiation on the pixel SE also decreases for the same number of pixels. A reduction in the chip and optical dimensions usually leads to lower manufacturing costs.

Optionally, a lower pitch allows more pixels SE to be accommodated on a sensor chip of given size, in order therefore to obtain a higher optical resolution capacity.

For example, the pixel size that can be practically realized is 90 μm in a 64×80 sensor array $K_1 \ldots K_N$ and 60 μm in a 120×84 sensor array $K_1 \ldots K_N$. This means that 32 signal processing channels on both sides of the sensor array $K_1 \ldots K_N$ then occupy less than 3 μm in width per channel.

In the 120×84 sensor array $K_1 \ldots K_N$ with 60 μm pixel size and one signal processing channel per pixel SE this still leaves a further 1.5 μm width per signal processing channel, if these are arranged parallel next to the sensor array TPA.

FIG. 2 shows a block wiring diagram of a circuit arrangement for the integrated signal processing for thermopile infrared sensor arrays TPA with mirror-symmetrical structure, with a central thermopile infrared sensor array TPA with one preamplifier VV, one downstream low-pass filter TPF and one analog-to-digital converter ADC per signal processing channel $K_1 \ldots K_N$ on two sides of the sensor array TPA per pixel SE.

The outputs of the analog-to-digital converters ADC are connected to a RAM memory field, which can be read out via a control circuit CRTL, so that the digital output signals are available at a digital input-output port DIO for further processing.

Furthermore, the modules necessary for the operation are located on each sensor chip SP, such as clock CLK and provide the required voltage supply VDD, VSS and one or more reference voltages VREF or REF/PTAT and also additional ESD circuit blocks.

A large number of individual signal processing channels $K_1 \ldots K_N$ is integrated on or under the same sensor chip SP, wherein a number a of no more than 16 or 8 pixels SE shares a signal processing channel $K_1 \ldots K_N$, but preferably only a=4, 3 or 2 pixels SE or even only one pixel SE share one signal processing channel.

Figure 3:
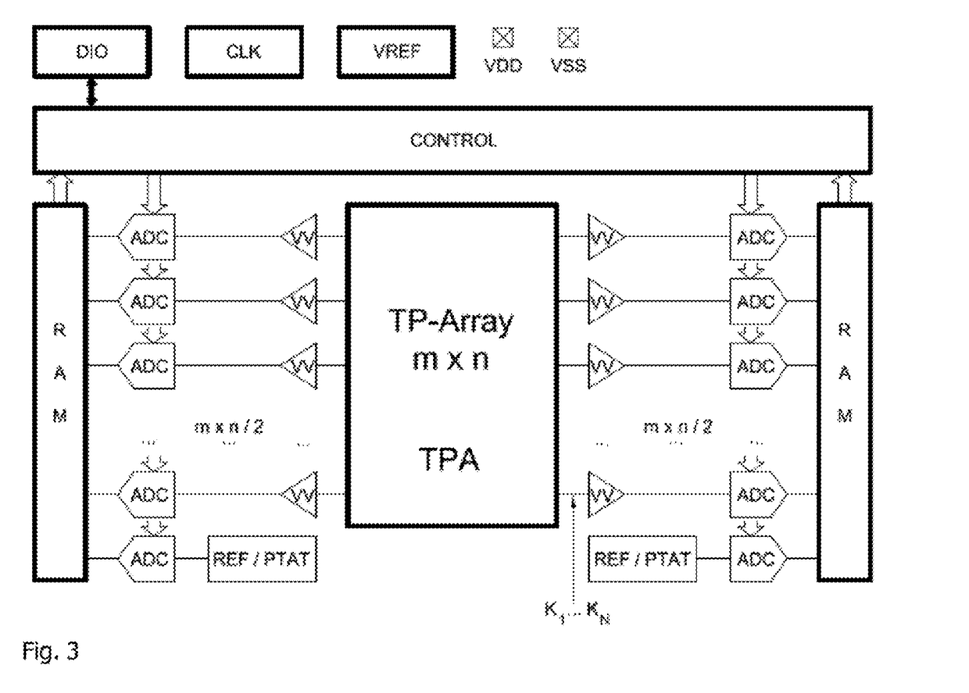
FIG. 3 is a block wiring diagram of a circuit arrangement for the integrated signal processing for thermopile infrared array sensor chips in a second embodiment, wherein the low-pass function is performed in an integrated ADC (AD-converter).
Figure 4A:
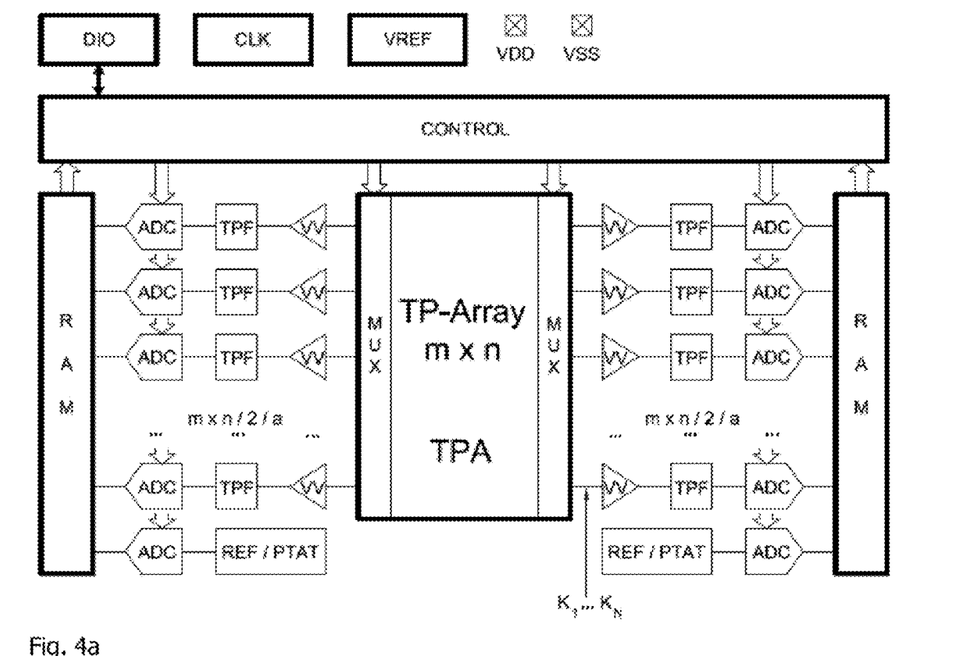

The appropriate number a of pixels SE is switched via multiplexer MUX, or sections of a multiplexer MUX, onto the respectively associated signal processing channel $K_1 \ldots K_N$ (FIG. 4a). Each pixel particularly preferably has its own signal processing channel $K_1 \ldots K_N$ (i.e. a=1); see FIG. 3 and FIG. 4b). In that case the smallest noise bandwidth and hence the lowest noise and the best temperature resolution are obtained. In addition, the multiplexers in front of the signal processing channel $K_1 \ldots K_N$ can then be omitted (FIG. 2).

In a sensor array TPA with at least 16 rows and at least 16 columns at least one pixel SE is connected to a signal processing channel $K_1 \ldots K_N$, wherein the number of signal processing channels $K_1 \ldots K_N$ is equal to at least 4 times the number of rows and wherein the center-to-center spacing of the pixels SE is less than 200 nm.

In addition, for each signal processing channel $K_1 \ldots K_N$ a signal multiplexer (MUX) is provided for selecting the pixels SP of the sensor array TPA assigned to the signal processing channel ($K_1 \ldots K_N$).

A preamplifier VV is connected upstream of the analog-to-digital converter ADC in each signal processing channel $K_1 \ldots K_N$, which has a gain factor of between less than 500 and less than 100, wherein the analog-to-digital converter ADC preferably has a resolution of at least 10 bits and works according to the charge balancing or Delta Sigma methods.

In a further development, each signal processing channel $K_1 \ldots K_N$ has a low-pass filter TPF for limiting the noise bandwidth, whose cutoff frequency is equal to at least the product of the frame rate of the thermopile infrared sensor array TPA and the number of pixels SE per signal processing channel $K_1 \ldots K_N$, but in no case more than eight times the value of the product, preferably less than three times the value of the product.

However, since more signal processing channels $K_1 \ldots K_N$ would also increase space requirements and power losses, in the case of sensor arrays TPA with very many pixels, with due consideration of thermal resolution and space requirements it can be especially useful to choose a>1.

In order to accommodate as many signal processing channels $K_1 \ldots K_N$ on the chip as possible, both the space requirements and the power loss of the individual channels must be very small, in order to minimize chip size and costs, but also thermal crosstalk between the thermopile pixels SE of the sensor array TPA. Currently, pixel sizes of 90 μm or even 60 μm are achieved. With advances in MEMS and CMOS technology, in the next few years pixel sizes of, e.g., 25 . . . 50 μm could also be achieved.

To achieve this, signal processing channels $K_1 \ldots K_N$ with only a small low-noise preamplifier VV with a relatively low gain factor, i.e. less than 500, and a slow power-saving analog-to-digital converter ADC with high resolution, i.e. with at least 10 bits, will be used.

Preferably, preamplifier VV has a gain factor of less than 100 and the resolution of the analog-to-digital converter ADC should preferably be between 16-bit and 24-bit.

By the combination of a preamplifier VV with low gain factor and a slow analog-to-digital converter ADC with high resolution, a low space requirement is ensured as a result of the low gain factor. In addition, a low power consumption is ensured due to the analog-to-digital converter ADC, which despite having a high resolution, operates with a comparatively low transfer rate.

In addition, the use of a high-resolution analog-to-digital converter ADC without the use of a preamplifier VV is conceivable. A small difference in the positive and negative reference voltage VREF of the analog/digital converters ADC is advantageous, because this increases the temperature resolution.

Suitable choices for the preamplifier VV are, for example, so-called auto-zero (switched chopper) amplifiers, characterized by low offset voltages and offset voltage drifts. With a gain factor <100 . . . 500 a chopper amplifier can be designed as a single stage and thus especially space and power-saving.

For slow analog-to-digital converters ADC with high resolution, suitable methods are, for example, the "Sigma/Delta" or the "charge balancing" methods. Since very many analog-to-digital converters ADC work in parallel on the sensor chip SP, in comparison to conventional thermopile infrared sensor arrays with only one analog-to-digital converter ADC a low change rate is obtained at the output, leading to the required low power loss and the low space requirement, such as can be explained by a 64×64 sensor array TPA.

Analog-to-digital converters that work according to the "Sigma/Delta" or the "charge balancing" methods are well-known and commonly used converters in the specialist field.

A sensor array designed according to the state of the art with 64×64 pixels and only one analog-to-digital converter, at a frame rate of 15 Hz, requires a conversion rate of the analog-to-digital converter ADC of 64×64 pixels×15 Hz=61, 440 Hz.

In analog-to-digital converters ADC operating in parallel a conversion rate of only 15 Hz (with a=1) or 60 Hz (with a=4) is required (a: number of pixels to be read at the same time). This allows the implementation of analog/digital converters ADC with high resolution (for example, 16-bit and more) with very low current and space consumption.

The digitized signals of each signal processing channel $K_1 \ldots K_N$ can be buffered in a storage field of a memory RAM before they are forwarded on to the serial output data stream of a digital I/O port DIO. This means that the time regime for reading out the data via the digital port DIO can be selected such that the entire time of an image is available for the integration and low pass filtering of the pixel signals.

The noise bandwidth of the signal processing channels $K_1 \ldots K_N$ should preferably be reduced to the minimum necessary, which is obtained from the product of the number of pixels SE per signal processing channel $K_1 \ldots K_N$ and the frame rate of the sensor array TPA.

This can be easily implemented by integrating a low-pass filter TPF before the analog-to-digital converter ADC, which is possible, for example, as part of the preamplifier VV, or as an additional low-pass filter TPF.

Figure 4B:
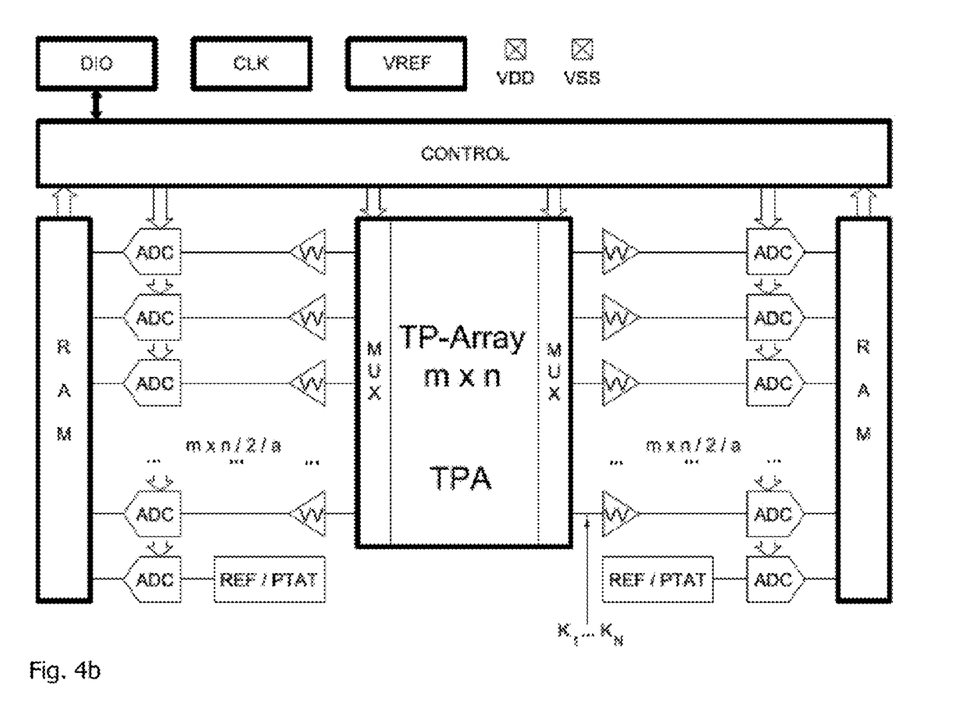

In FIG. 3 and FIG. 4b a particularly space-saving alternative design is shown, in which the reduction of the noise bandwidth is achieved in a particularly preferred manner by the integrator behavior of a suitable analog-to-digital converter ADC, e.g. an analog-to-digital converter ADC which works according to the charge balancing method.

With the new signal processing described above, a significant improvement in overall performance is obtained.

In the case of white noise, as is well known, the noise increases with the square root of the signal or noise bandwidth of the preamplifier VV. When using a 64×64 sensor array from the prior art, the noise bandwidth would increase by 64×64 times the frame rate with only one preamplifier VV, and still by 64 times the frame rate with one signal amplifier per column.

Consequently, the total noise and the temperature resolution of a 64×64 sensor array with a preamplifier VV would be 64 times higher, and with 64 column amplifiers still about 8 times higher than in the case of an array in which each pixel has its own signal channel.

Thus, for example, a 64×64 sensor array TPA can achieve a thermal resolution of up to 8 times higher than sensor arrays designed according to the state of the art. Following the same analysis, with a 16×16 sensor array TPA the potential improvement obtained in the thermal resolution capacity is a factor of 4, with a 32×32 sensor array TPA a factor of 5.5 and when using a 128×128 sensor array TPA, approximately an 11-fold improvement is obtained.

If in a 128×128 sensor array TPA the number of signal processing channels were reduced and, for example, a=16 pixels sharing a signal processing channel, instead of an 11-fold improvement in the thermal resolution capacity, a 3-fold improvement in the signal-to-noise ratio would still be obtained compared to WO 2006/122529 A1, and compared to the rest of the prior art with only one signal transmission channel, a roughly 32-fold improvement would be achieved.

Figure 5:
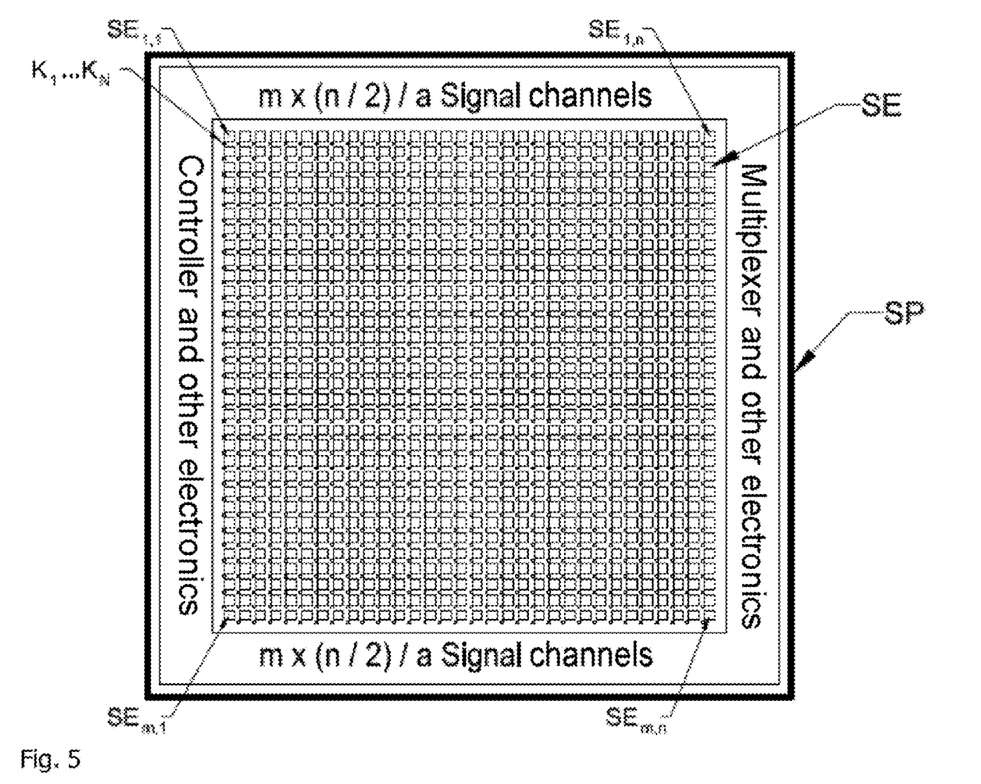
FIG. 5 is a block wiring diagram of a circuit arrangement for the integrated signal processing for thermopile infrared array sensor chips, wherein the low-pass function is performed in an integrated AD converter.

The signal processing channels $K_1 \ldots K_N$ can be arranged both in the edge region of the individual pixels SE, as shown in FIG. 5, in the peripheral edge region of the sensor chip SP, i.e. outside the pixels, or distributed over both areas.

In order to obtain a good thermal balance and thus a homogeneous thermal image over the entire sensor chip SP, the power losses of the various modules should be distributed over the sensor chip SP as homogeneously and symmetrically as possible.

In addition to the actual signal processing channel s $K_1 \ldots K_N$ and the multiplexers MUX, other electronic components can be integrated on the sensor chip alongside them and switched via the multiplexers MUX on to the digital interface (see FIG. 1 and FIG. 5). These additional electronic components can be temperature references, voltage references, storage media (e.g. EEPROMs for storing calibration data), including where appropriate, small μControllers, e.g. for further signal processing or temperature calculation.

Furthermore, it can be advantageous that additional information REF/PTAT or the drain voltage VDD measured on the chip itself, such as, for example, the signals of image pixels or image elements, which are inserted with the serial data stream via the same signal processing channel in order to compensate for drift effects and thus increase the measurement accuracy.

When an integrating analog-to-digital converter ADC is used the setting of the most favorable noise bandwidth for the respective frame rate can be specified using the internally generated mother clock and the conversion rate defined by the specified timing regime.

Figure 6A:
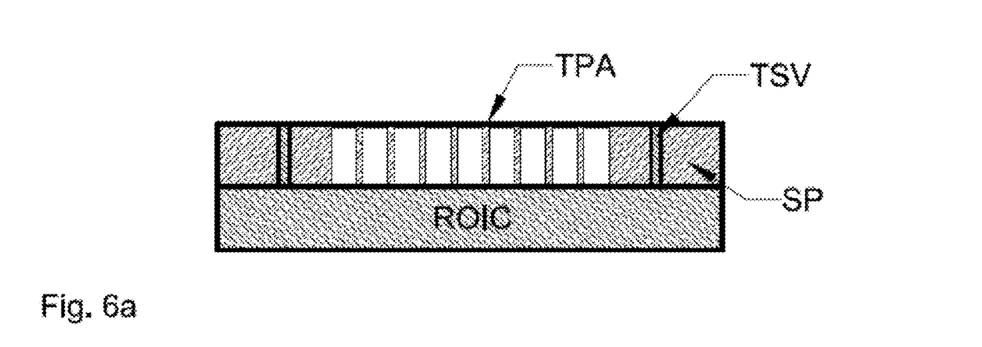
FIG. 6a is a schematic cross-sectional view of a sensor chip with vias and a separate chip arranged below this with signal processing channels integrated therein and additional memory and signal processing electronics.
Figure 6B:
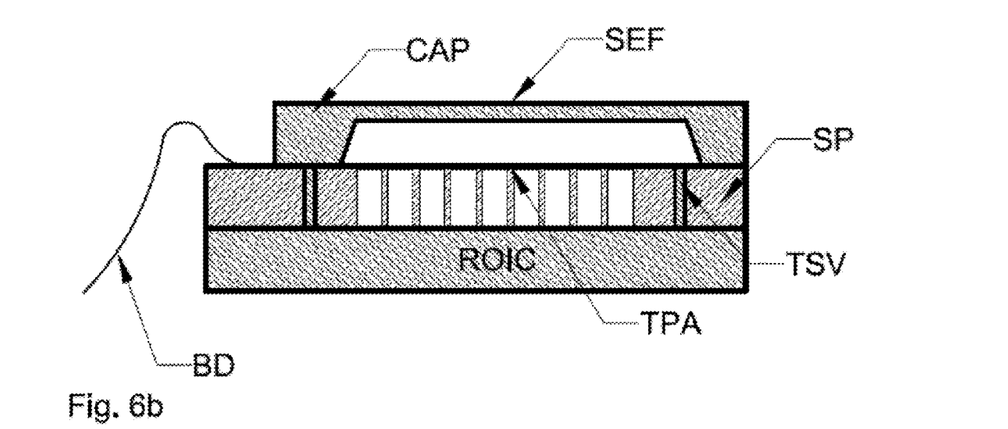
FIG. 6b shows the arrangement according to FIG. 6a but supplemented with a covering wafer with a radiation entry window and additional electrical connection means, such as bond wires for connecting to additional functional modules for the operation of the thermopile infrared sensor array.

For the sake of completeness, it should be noted that the signal processing channels $K_1 \ldots K_N$ can also be arranged on a separate chip ROIC, underneath the actual sensor chip SP (FIG. 6a, 6b).

FIG. 6a shows a schematic cross-sectional view of a sensor chip SP with vias TSV and a separate chip ROIC arranged under the latter with signal processing channels $K_1 \ldots K_N$ integrated therein and with the additional storage and signal processing electronics as described above. The vias TSV are through holes through the sensor chip SP that are filled with a conductive material, which are insulated from the sensor chip SP and which are each connected at the ends to conductor tracks, not shown, on the sensor chip SP or on the separate chip ROIC. It goes without saying that a mechanically fixed connection must also exist between the sensor chip SP and the separate chip RIOC.

From FIG. 6b, the same arrangement as shown in FIG. 6a can be seen, but supplemented with a cover wafer CAP on the sensor chip SP with a radiation entry window SEF. The cover wafer CAP can be entirely composed of a material transparent to infrared, or else only have such a region above the sensor array TPA.

Furthermore, additional electrical connection means can be provided, such as bond wires BD for connecting the sensor chip SP with additional function modules on a printed circuit board or the like, which are required for the operation of the thermopile infrared sensor array TPA.

Instead of the vias TSV for the electrical connection between the sensor chip SP and the separate chip ROIC, rewiring schemes can also be considered, in which conductor tracks are routed around the side edge from the sensor chip SP to the separate chip ROIC.

LIST OF REFERENCE NUMERALS

TPA sensor array
VV preamplifier
TPF low pass filter
ADC analog-to-digital converter
$K_1 \ldots K_N$ signal processing channel
SE pixel SP sensor chip
RAM memory area
CRTL control circuit
DIO digital port
CLK clock
VREF reference voltage
VDD drain voltage
VSS source voltage
MUX multiplexer
REF/PTAT temperature reference
a number of pixels per signal processing channel
TSV through contact
ROIC separate chip
CAP cover wafer
SEF radiation entrance window
BD bond wire

The invention claimed is:

1. A high-resolution thermopile infrared sensor array having pixels arranged in at least 16 rows and 16 columns and monolithic integrated signal processing on a sensor chip (SP),
having a plurality of parallel signal processing channels ($K_1 \ldots K_N$) for signals of the pixels (SE) of the sensor array (TPA),
and a digital port (DIO) for the serial output of the signals of the pixels (SE),
each signal processing channel ($K_1 \ldots K_N$) having at least one analog-to-digital converter (ADC) and one low-pass filtering,
wherein for each signal processing channel ($K_1 \ldots K_N$) a storage area in a memory (RAM) is present for storing results of the at least one analog-to-digital converter (ADC),
wherein in the sensor array (TPA) at most 16 pixels (SE) share a signal processing channel ($K_1 \ldots K_N$),
wherein the number of the signal processing channels ($K_1 \ldots K_N$) is at least 4 times the number of rows,
wherein one portion of the signal processing channels ($K_1 \ldots K_N$) is arranged in an intermediate space between the pixels (SE) and another portion of the signal processing channels ($K_1 \ldots K_N$) is arranged in an outer edge area of the sensor chip (SP) surrounding the sensor array (TPA) together with other electronics,
wherein for each signal processing channel ($K_1 \ldots K_N$) with a number of pixels (SE) a>1 a signal multiplexer (MUX) is provided for selecting the pixels (SP) of the sensor array (TPA) assigned to the signal processing channel ($K_1 \ldots K_N$),
wherein the at least one analog-to-digital converter (ADC) associated with each signal processing channel ($K_1 \ldots K_N$) has a resolution of at least 10 bits,
wherein the low-pass filtering, to limit a noise bandwidth, is carried out with a cutoff frequency which is less than three times and no more than eight times the value of the product of a frame rate of the thermopile infrared sensor array (TPA) and a number (a) of pixels per signal processing channel ($K_1 \ldots K_N$), and
wherein a center-to-center distance between the pixels (SE) is less than 200 µm.

2. The high-resolution thermopile infrared sensor array as claimed in claim 1, wherein a preamplifier (VV) is connected upstream of the at least one analog-to-digital converter (ADC) in each signal processing channel ($K_1 \ldots K_N$), which has a gain factor of less than 500.

3. The high-resolution thermopile infrared sensor array as claimed in claim 1, wherein the at least one analog-to-digital converter (ADC) operates according to the charge balancing or Delta-Sigma method.

4. The high-resolution thermopile infrared sensor array as claimed in claim 1, wherein each signal processing channel ($K_1 \ldots K_N$) contains a low pass filter (LPF) to limit the noise bandwidth, whose cutoff frequency is equal to at least the product of the frame rate of the thermopile infrared sensor array (TPA) and the number (a) of pixels (SE) per signal processing channel ($K_1 \ldots K_N$).

5. The high-resolution thermopile infrared sensor array as claimed in claim 4, wherein the at least one analog-to-digital converter (ADC) is integrating and wherein the low pass filter (LPF) is arranged in the at least one analog-to-digital converter (ADC).

6. The high-resolution thermopile infrared sensor array as claimed in claim 5, wherein the noise bandwidth of each signal processing channel ($K_1 \ldots K_N$) is determined as a function of the respective frame rate by an externally specified or internally generated mother clock and a specified conversion rate of the analog-to-digital converter (ADC) by using the integrating analog-to-digital converter (ADC).

7. The high-resolution thermopile infrared sensor array as claimed claim 1, wherein a portion of the signal processing channels ($K_1 \ldots K_N$) is arranged with the sensor elements (SE) on a separate chip underneath the sensor chip (SP), wherein the thermopile infrared sensor chip (SP) and the separate chip (ROIC) are fixedly connected to each other.

* * * * *